United States Patent
Barkale (10) Patent No.: US 10,297,269 B2
(45) Date of Patent: May 21, 2019

(54) AUTOMATIC CALCULATION OF GAINS FOR MIXING NARRATION INTO PRE-RECORDED CONTENT

(71) Applicant: Dolby Laboratories Licensing Corporation, San Francisco, CA (US)

(72) Inventor: Suraj Suhas Barkale, North Sydney (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 169 days.

(21) Appl. No.: 15/271,363

(22) Filed: Sep. 21, 2016

(65) Prior Publication Data

US 2017/0092290 A1    Mar. 30, 2017

Related U.S. Application Data (60) Provisional application No. 62/312,361, filed on Mar. 23, 2016, provisional application No. 62/222,998, filed on Sep. 24, 2015.

(51) Int. Cl.
| | |
|---|---|
| *G10L 21/034* | (2013.01) |
| *G10L 25/51* | (2013.01) |
| *G10L 21/0364* | (2013.01) |
| *G10L 21/0356* | (2013.01) |

(52) U.S. Cl.
CPC ........ *G10L 21/034* (2013.01); *G10L 21/0356* (2013.01); *G10L 21/0364* (2013.01); *G10L 25/51* (2013.01)

(58) Field of Classification Search
CPC ............... G10L 21/034; G10L 21/0356; G10L 21/0364; G10L 25/51

USPC .......................................................... 704/225
See application file for complete search history.

(56) References Cited

U.S. PATENT DOCUMENTS

| | | |
|---|---|---|
| 7,302,050 B1 | 11/2007 | Michalewicz |
| 8,548,618 B1 | 10/2013 | Story |
| 8,726,312 B1 | 5/2014 | Hewinson |
| 2002/0091793 A1 | 7/2002 | Sagiekk |
| 2002/0099552 A1 | 7/2002 | Rubin |
| 2003/0003431 A1* | 1/2003 | Maeda ............... G09B 15/00 434/307 A |
| 2005/0042591 A1* | 2/2005 | Bloom ............... G11B 27/034 434/307 A |
| 2006/0041632 A1 | 2/2006 | Shah |
| 2006/0165240 A1* | 7/2006 | Bloom ............... G10H 1/366 381/56 |
| 2007/0130253 A1 | 6/2007 | Newson |
| 2008/0141180 A1 | 6/2008 | Reed |
| 2008/0165388 A1 | 7/2008 | Serlet |

(Continued)

FOREIGN PATENT DOCUMENTS

EP    2 695 161    2/2014

OTHER PUBLICATIONS

Cotton, Courtenay V. "Characterizing Audio Events for Video Soundtrack Analysis" Dec. 2013, DAI-B 74/06(E), Number of pp. 96.

(Continued)

*Primary Examiner* — Edwin S Leland, III (57) ABSTRACT

A system and method of mixing narration into content. The system automatically reduces the volume of the content according to a threshold value and a knee value. In this manner, the audio of the content does not overwhelm the narration.

20 Claims, 5 Drawing Sheets

(56) References Cited

U.S. PATENT DOCUMENTS

| | | |
|---|---|---|
| 2009/0006962 A1 | 1/2009 | Ives |
| 2009/0238538 A1 | 9/2009 | Fink |
| 2009/0296959 A1* | 12/2009 | Bongiovi ............... H04R 3/04 381/103 |
| 2010/0023849 A1 | 1/2010 | Hakim |
| 2010/0293463 A1 | 11/2010 | Snyder |
| 2011/0115766 A1* | 5/2011 | Kerofsky ............. G06T 5/003 345/207 |
| 2011/0202967 A1 | 8/2011 | Hecht |
| 2011/0257967 A1 | 10/2011 | Every |
| 2011/0273455 A1* | 11/2011 | Powar ............ G06F 17/30769 345/473 |
| 2013/0103396 A1* | 4/2013 | Swanson ............... H03G 7/002 704/225 |
| 2013/0130216 A1 | 5/2013 | Morton |
| 2013/0191708 A1 | 7/2013 | Song |
| 2014/0011428 A1 | 1/2014 | Barthold |
| 2014/0025389 A1* | 1/2014 | Hoffmann ............ G10L 19/008 704/500 |
| 2014/0039883 A1* | 2/2014 | Yang ..................... G10H 1/366 704/207 |
| 2014/0241702 A1 | 8/2014 | Solbach |
| 2014/0258462 A1 | 9/2014 | Hwang |
| 2014/0282013 A1 | 9/2014 | Amijee |
| 2014/0288686 A1 | 9/2014 | Sant |
| 2015/0032446 A1* | 1/2015 | Dickins .................. G10L 25/78 704/233 |
| 2015/0155008 A1 | 6/2015 | Herberger |
| 2015/0261747 A1 | 9/2015 | Goldstein |
| 2016/0165362 A1* | 6/2016 | Hubert-Brierre ........................... A61N 1/36036 381/320 |
| 2016/0180861 A1* | 6/2016 | Masuda ............. G10L 21/0316 704/225 |
| 2017/0092290 A1* | 3/2017 | Barkale ................ G10L 21/034 |
| 2017/0201714 A1* | 7/2017 | Kim ...................... H04N 5/911 |
| 2017/0223397 A1* | 8/2017 | Rivera ................. G11B 27/002 |

OTHER PUBLICATIONS

Movie Guide, John Larkin (2013), available at www.larkin.net.au/resources/iMovie_guide.pdf.

Movie for iPhone, Appendix from iPhone: The Missing Manual, 4th Edition (O'Reilly Media, 2010), available at examples.oreilly.com/9781449393656for Movie_for_iPhone.pdf.

* cited by examiner

AUTOMATIC CALCULATION OF GAINS FOR MIXING NARRATION INTO PRE-RECORDED CONTENT

CROSS REFERENCE TO RELATED APPLICATIONS

This application claims the benefit of U.S. Provisional App. No. 62/222,998 for "Intelligent Mixing" filed Sep. 24, 2015 and U.S. Provisional App. No. 62/312,361 for "Automatic Calculation of Gains for Mixing Narration into Pre-Recorded Content" filed Mar. 23, 2016, which is incorporated herein by reference.

BACKGROUND

The present invention relates to audio mixing, and in particular, to automatic calculation of gains for mixing narration into pre-recorded content.

Unless otherwise indicated herein, the approaches described in this section are not prior art to the claims in this application and are not admitted to be prior art by inclusion in this section.

Mobile devices (e.g., mobile telephones, cellular telephones, etc.) are increasing in functionality. Example functions include audio capture, photo capture, video capture, location tagging, and communication of all the captured data. As a result, the mobile device allows a user to capture, generate and create a large amount of data.

One issue is how to integrate all this data. The form factor of the mobile device is small, and often for integration of audio and video data, a separate device must be used. Consider the following example use cases.

In example use case 1, the user is a father who captures audio and video of his children, which he sends to his parents. In some environments (e.g., at home), he adds commentary concurrently with capturing the audio and video. However, in other environments (e.g., birthday parties, school events, musical recitals, etc.), he is not able to add commentary concurrently. Instead, he transfers the audio and video to another computer that has an editing program, which he uses to add the commentary.

In example use case 2, the user is a blogger who attends events, captures audio and video, and posts the content on her blog. Sometimes she is able to add commentary concurrently with capturing the content. However, other times she is not, and instead must type a textual description to go in the blog posting of the content. This introduces a delay in creating her blog post.

In example use case 3, the user is a film student who uses his mobile device to capture audio and video when reconnoitering locations and shots for his film projects. When capturing the content, he likes to add commentary of additional ideas and notes that he carries forward when planning the shots for the film project. However, often the locations have loud ambient noise that drowns out his commentary.

In example use case 4, the user is a student who attends concerts, captures portions of audio and video, and posts the content using social media (e.g., the Twitter™ service, the Facebook™ service, etc.). She would like to add commentary contemporaneously with capturing the content; however, the ambient noise is too great to allow this.

SUMMARY

Given the above, when mixing a voiceover into a prerecorded audio, it is often desirable to reduce the volume of the prerecorded audio that overlaps with the voiceover, in order for the voiceover to be audible. The amount of reduction depends on the prerecorded content and the relative volume of narration to prerecorded audio. Embodiments calculate the amount of attenuation for the prerecorded audio at every instance based on analysis by the system of both the prerecorded audio and the voiceover. In addition, embodiments implement the attenuation and mixing automatically, reducing the amount of time and effort required by a user.

According to an embodiment, a method automatically mixes first audio and second audio that are associated with video. The method includes receiving, by a mobile device, a user selection of a first content item. The first content item has video data and first audio data, and the first audio data is synchronized with the video data. The method further includes outputting, by the mobile device, the video data and the first audio data. The method further includes receiving, by the mobile device, second audio data from a microphone of the mobile device. The second audio data is received contemporaneously with outputting the video data and the first audio data. The method further includes calculating, by the mobile device, a loudness measure. The loudness measure includes a loudness of the first audio data. The method further includes attenuating, by the mobile device, the first audio data according to the loudness measure to form attenuated first audio data. The method further includes mixing, by the mobile device, the attenuated first audio data and the second audio data to form a second content item. The second content item has the video data, the attenuated first audio data, and the second audio data. The attenuated first audio data and the second audio data are synchronized with the video data. The method further includes storing, by the mobile device, the second content item having been formed.

The second audio data may correspond to narration by a user of the mobile device.

The method may further include receiving, by the mobile device, the video data and the first audio data. The video data is received from a camera of the mobile device, and the first audio data is received from a microphone of the mobile device. The method may further include storing, by the mobile device, the video data and the first audio data as the first content item in a local storage of the mobile device.

The user selection may select the first content item from a plurality of first content items stored in a local storage of the mobile device.

The user selection may select the first content item from a plurality of first content items stored in a remote storage that is remote from the mobile device. The method may further include downloading, by the mobile device, the first content item from the remote storage.

The video data may be outputted from a display of the mobile device, and the first audio data may be outputted from a speaker of the mobile device.

Calculating the loudness measure may include calculating a first loudness of a voice signal in the first audio data, calculating a second loudness of a non-voice signal in the first audio data, and calculating a third loudness of the second audio data.

Calculating the loudness measure may include calculating a first loudness of a voice signal in the first audio data, calculating a second loudness of a non-voice signal in the first audio data, calculating a third loudness of the second audio data, and determining the loudness measure as the first loudness plus the second loudness minus the third loudness.

Attenuating the first audio data may include comparing the loudness measure with a threshold value and a knee value.

Attenuating the first audio data may include comparing the loudness measure with a threshold value, where the first audio data is attenuated when the loudness measure exceeds the threshold value.

Attenuating the first audio data may include comparing the loudness measure with a knee value. When the loudness measure is less than the knee value, the first audio data may be attenuated using a first low ratio compressor based on the loudness measure. When the loudness measure is greater than the knee value, the first audio data may be attenuated using a sum of a second low ratio compressor and a high ratio compressor. The second low ratio compressor is based on the knee value, and the high ratio compressor is based on the loudness measure minus the knee value.

The method may further include uploading, by the mobile device, the second content item to a remote storage that is remote from the mobile device.

The method may further include outputting, by the mobile device, the video data, the attenuated first audio data, and the second audio data. The video data is outputted from a display of the mobile device, and the attenuated first audio data and the second audio data are outputted from a speaker of the mobile device.

The method may further include receiving, by the mobile device, a user selection of a mute command, when outputting the video data and the first audio data. The first audio data is completely attenuated when the user selection of the mute command is received.

According to an embodiment, an apparatus automatically mixes first audio and second audio that are associated with video. The apparatus includes a processor, a memory, a screen, a camera, a microphone, a speaker, and a radio. The processor is configured to receive a user selection of a first content item. The first content item has video data and first audio data, and the first audio data is synchronized with the video data. The screen is configured to output the video data, and the speaker is configured to output the first audio data. The microphone is configured to receive second audio data. The second audio data is received contemporaneously with the screen outputting the video data and the speaker outputting the first audio data. The processor is configured to calculate a loudness measure, where the loudness measure includes a loudness of the first audio data. The processor is configured to attenuate the first audio data according to the loudness measure to form attenuated first audio data. The processor is configured to mix the attenuated first audio data and the second audio data to form a second content item. The second content item has the video data, the attenuated first audio data, and the second audio data. The attenuated first audio data and the second audio data are synchronized with the video data. The memory is configured to store the second content item having been formed.

The processor may be further configured to perform one or more of the method steps described above.

According to an embodiment, a non-transitory computer readable medium stores a computer program for controlling a mobile device to automatically mix first audio and second audio that are associated with video. The mobile device may include a processor, a memory, a screen, a camera, a microphone, a speaker, and a radio, as described above. The computer program when executed by the processor may perform one or more of the method steps described above.

The following detailed description and accompanying drawings provide a further understanding of the nature and advantages of various implementations.

DETAILED DESCRIPTION

Described herein are techniques for mixing audio. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

This document uses the terms "audio", "audio signal" and "audio data". In general, these terms are used interchangeably. When specificity is desired, the term "audio" is used to refer to the input captured by a microphone, or the output generated by a loudspeaker; the term "audio data" is used to refer to data that represents audio, e.g. as processed by an analog to digital converter (ADC), as stored in a memory, or as communicated via a data signal.

This document uses the terms "video", "video signal" and "video data". In general, these terms are used interchangeably. When specificity is desired, the term "video" is used to refer to the input captured by a camera or video recorder, or the output generated by a display screen; the term "video data" is used to refer to data that represents video, e.g. as processed by an analog to digital converter (ADC), as stored in a memory, or as communicated via a data signal.

This document uses the terms "content" and "user generated content" (UGC). In general, these terms are used interchangeably. Content may include audio, video, or synchronized audio and video. In general, user generated content may have highly variable audio as compared to commercially produced content, for example due to the user generated content audio being captured by consumer-grade equipment (as compared to professional grade equipment), not being adjusted in post-processing (as professionally produced audio would be), etc.

This document uses the terms "narration", "commentary" and "user generated commentary". In general, these terms are used interchangeably. Narration is generally audio in the form of spoken words. Narration may be added to content in order to provide description, elaboration, context or other additional information regarding the content.

Figure 1:
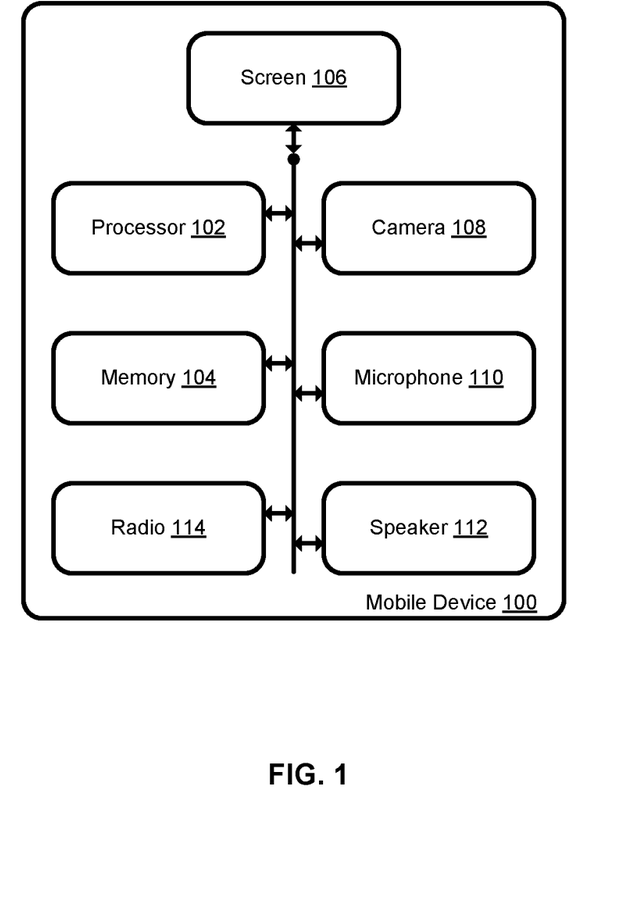
FIG. 1 is a block diagram of a mobile device 100.

FIG. 1 is a block diagram of a mobile device 100. The mobile device 100 may be a mobile telephone, a cellular telephone, etc. The mobile device 100 includes a processor 102, a memory 104, a screen 106, a camera 108, a microphone 110, a speaker 112, and a radio 114. The mobile device 100 may include other components that (for brevity) are not shown.

The processor 102 generally controls the operation of the mobile device 100. The processor 102 may execute one or more computer programs that control the features of the mobile device 100. Among other features, the processor 102 controls the mobile device 100 to automatically balance the audio level when mixing audio streams. This feature is discussed in more detail below.

The memory 104 generally provides data storage for the mobile device 100. The memory 104 may store audio data, video data, or other content. The memory 104 may also store one or more computer programs that, when executed by the processor 102, control the operation of the mobile device 100. The memory 104 may be implemented with one or more of random access memory (RAM), read only memory (ROM), solid-state memory (SSD), flash memory, etc.

The screen 106 generally provides visual output from the mobile device 100. For example, the screen 106 may display user interface functionality, video data, etc. The video data may be stored locally in the memory 104, or may be received via the radio 114. The screen 106 may be a touch screen that also receives user input.

The camera 108 generally captures image data and video data for storage in the memory 104, and the microphone 110 generally captures audio data for storage in the memory 104. Often the camera 108 captures the video data contemporaneously with the microphone 110 capturing the audio data.

The speaker 112 generally provides auditory output from the mobile device 100. For example, the speaker 112 may output user interface functionality (e.g., alerts, etc.), audio data, etc. The audio data may be stored locally in the memory 104, or may be received via the ratio 114.

The radio 114 generally transmits and receives radio signals for the device 100 to communicate with other devices. The radio may be a cellular radio (e.g., fourth generation (4G) standard, long term evolution (LTE) standard, etc.), a wireless local area network (WLAN) radio (e.g., Institute of Electrical and Electronics Engineers (IEEE) 802.11 standard, etc.), a Bluetooth™ radio (e.g., IEEE 802.15.1 standard, etc.), etc. The device 100 may have multiple radios, each communicating using a particular standard or a particular radio spectrum.

As discussed in more detail below, the user may use the camera 108 and the microphone 110 to capture content, which may be stored in the memory 104. The user may then view the content on the screen 106 (and hear the captured audio via the speaker 112), and add narration or other commentary via the microphone 110. The mobile device 110 automatically balances the audio level when mixing the captured audio and the narration. The mobile device 110 may execute a computer program (e.g., an app) that controls the narration and mixing process.

As more fully detailed below, the mobile device 100 implements intelligent mixing that calculates time varying volume levels, determines an appropriate ducking amount, and performs ducking on the level of the audio in the original content so that the narration is audible. Intelligent mixing operates in the following four general use cases. First, audio in the original content that is louder than the narration is attenuated so that the narration is audible. Second, audio in the original content that is quieter than the narration is passed through, as it provides a background for the narration. Third, audio in the original content containing dialog is attenuated to make sure that the narration is audible. Fourth, during narration, the perceived level of audio in the original content remains generally constant.

Figure 2:
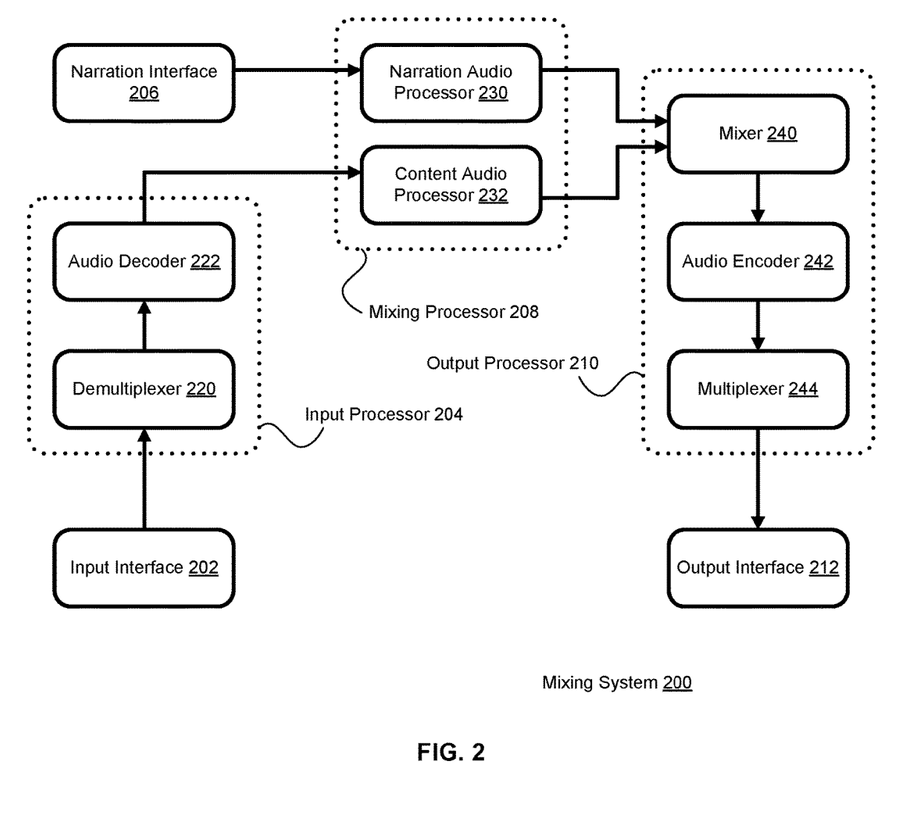
FIG. 2 is a block diagram of a mixing system 200.

FIG. 2 is a block diagram of a mixing system 200. The mixing system 200 generally implements the mixing of captured audio and narration using the mobile device 100 (see FIG. 1). The mixing system 200 may be implemented by one or more computer programs that are executed by the mobile device 100, and that interact with the other components of the mobile device 100. The mixing system 200 includes an input interface 202, an input processor 104, a narration interface 206, a mixing processor 208, an output processor 210, and an output interface 212.

The input interface 202 generally provides content to the mixing system 200. In general, the content includes synchronized video data and audio data. The content may be in MPEG-4 (Moving Picture Experts Group MP4) format, H.264 format, etc. The content may be stored locally (e.g., in the memory 104 of FIG. 1), or accessed remotely (e.g., using the radio 114 of FIG. 1). The content may have been captured by the camera 108 and the microphone 110 (see FIG. 1).

The input processor 204 generally provides the audio data from the content to the mixing processor 208 and video data from the content to the output processor 210. The input processor 204 includes a demultiplexer 220 and an audio decoder 222. The demultiplexer 220 generally demultiplexes the video data and the audio data from the content. The demultiplexer 220 provides the video data to the output processor 210, and provides the audio data to the audio decoder 222. The audio decoder 222 generally performs decoding of the audio data. For example, the content may have audio data encoded in monaural advanced audio coding (AAC) format, and the audio decoder 222 may decode the audio data into 16-bit pulse coded modulation (PCM) format.

The narration interface 206 generally provides narration to the mixing system 200. The narration is generally audio data captured by the microphone 110 (see FIG. 1) contemporaneously with the mobile device 100 outputting the content, enabling the user to add narration to the content. The narration may be in 16-bit PCM format. The narration interface 206 provides the narration to the mixing processor 208.

The mixing processor 208 generally processes the audio from the content and the narration. The mixing processor 208 includes a narration audio processor 230 and a content audio processor 232. The narration audio processor 230 receives the narration from the narration interface 206, and processes the narration. The content audio processor 232 receives the audio of the content from the audio decoder 222. The narration audio processor 230 provides the processed narration to the output processor 210, and the content audio processor 232 provides the processed audio of the content to the output processor 210.

The output processor 210 generally receives the narration and the audio of the content from the mixing processor 208, combines the narration and the audio of the content with the video data from the input processor 204, and provides the resulting content to the output interface 212. The output processor 210 includes a mixer 240, an audio encoder 242, and a multiplexer 244. The mixer 240 receives the narration from the narration audio processor 230 and the audio of the content from the content audio processor 232, mixes the narration and the audio of the content, and provides the resulting audio mix to the audio encoder 242.

The audio encoder 242 receives the mixed audio from the mixer 240 and encodes the mixed audio. For example, the mixed audio may be in 16-bit PCM format, and the audio encoder 242 encodes the mixed audio into AAC format. The audio encoder provides the encoded, mixed audio to the multiplexer 244.

The multiplexer 244 receives the mixed audio from the audio encoder 242 and the video data from the demultiplexer 220, multiplexes the mixed audio and the video data, and outputs the resulting content to the output interface 212. The resulting content (also referred to as the new content) thus corresponds to the original content plus the narration. The new content may be in MP4 format.

The output interface 212 generally outputs the new content from the mixing system 200. The output interface 212 may interact with the memory 104 (see FIG. 1) to store the new content locally, with the screen 106 and speaker 112 (see FIG. 1) to output the new content locally, or with the radio 114 (see FIG. 1) to communicate the new content remotely.

Figure 3:
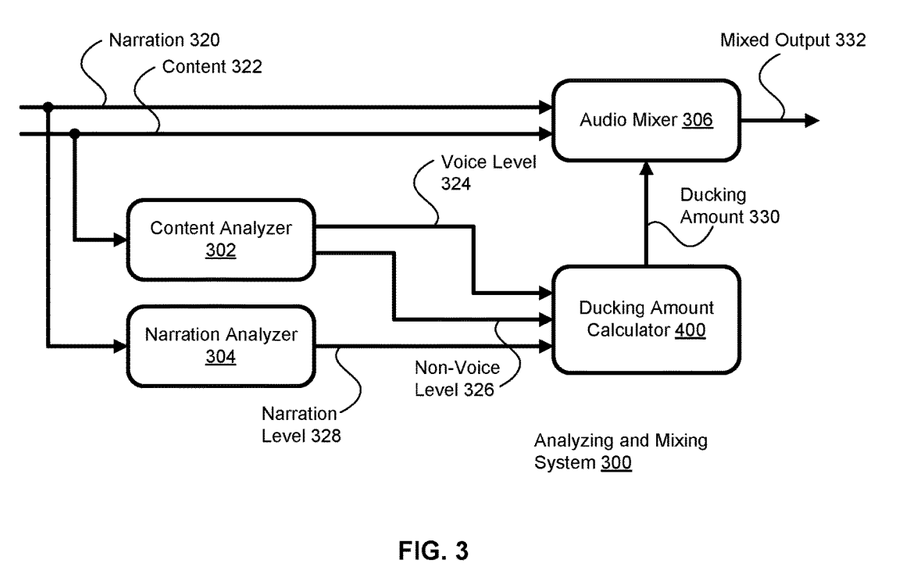
FIG. 3 is a block diagram of an analyzing and mixing system 300.

FIG. 3 is a block diagram of an analyzing and mixing system 300. The analyzing and mixing system 300 shows alternative details of the mixing processor 208 and the mixer 240 (see FIG. 2). The analyzing and mixing system 300 generally implements the analyzing and mixing functions of the mobile device 100 (see FIG. 1). The analyzing and mixing system 300 may be implemented by one or more computer programs that are executed by the mobile device 100, and that interact with the other components of the mobile device 100. The analyzing and mixing system 300 receives narration data 320 (e.g., corresponding to the narration data from the narration interface 206 of FIG. 2) and content audio data 322 (e.g., corresponding to the decoded audio of the content from the audio decoder 222 of FIG. 2). The analyzing and mixing system 300 includes a content analyzer 302, a narration analyzer 304, a ducking amount calculator 400, and an audio mixer 306.

The content analyzer 302 receives the content audio data 322, analyzes the content audio data 322, and generates a voice level 324 and a non-voice level 326. The voice level 324 corresponds to the level (e.g., loudness) of vocal sounds (e.g., speech sounds) detected in the content audio data 322, and the non-voice level 326 corresponds to the level of sounds other than vocal sounds (e.g., non-speech sounds). These levels may be root mean square (RMS) audio levels in decibels (dB).

The narration analyzer 304 receives the narration data 320, analyzes the narration data 320, and generates a narration level 328.

The ducking amount calculator 400 receives the voice level 324, the non-voice level 326 and the narration level 328, calculates a ducking amount 330, and provides the ducking amount 330 to the audio mixer 306. Further details of the ducking amount calculator 400 are provided with reference to FIG. 4.

The audio mixer 306 receives the narration data 320, the content audio data 322 and the ducking amount 330, mixes the narration data 320 and the content audio data 322 according to the ducking amount 330, and generates a mixed output 332. The mixed output 332 may be provided to the audio encoder 242 (see FIG. 2). In general, the level of the narration data 320 is within a desirable range, and the audio mixer reduces the level of the content audio data 322 according to the ducking amount when the level of the content audio data 322 is above the desirable range.

Figure 4:
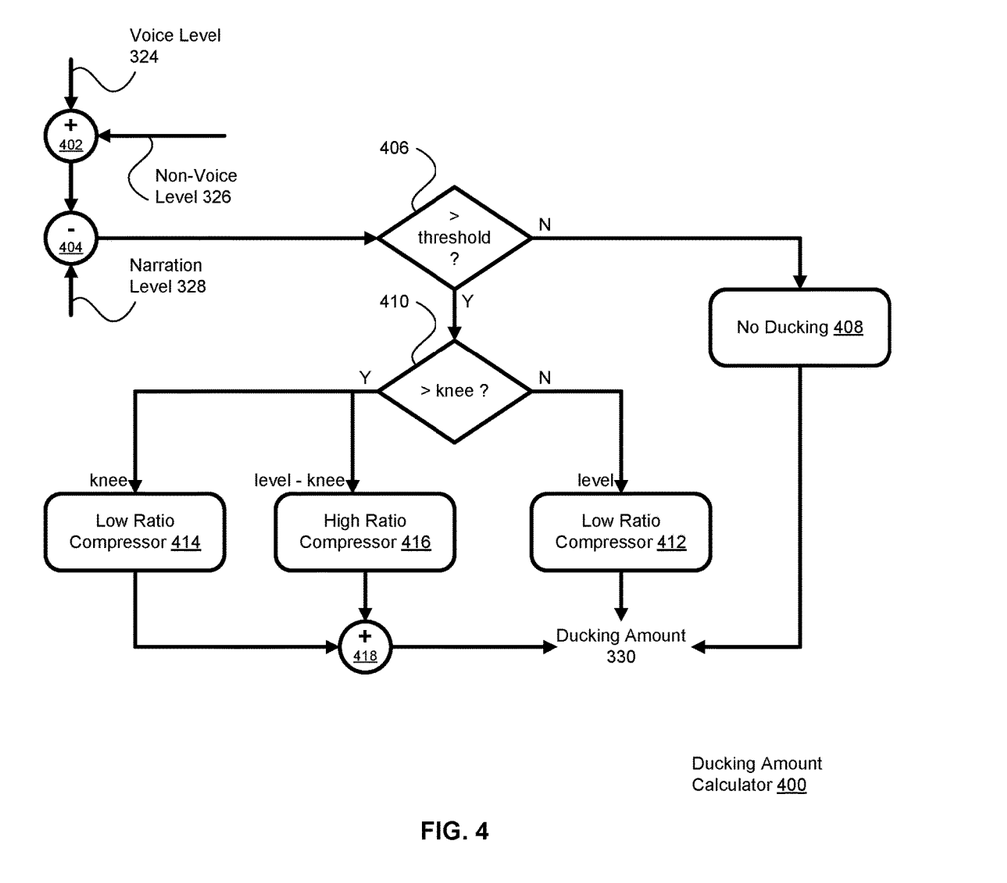
FIG. 4 is a flow diagram showing more details of the ducking amount calculator 400 (see FIG. 3).

FIG. 4 is a flow diagram showing more details of the ducking amount calculator 400 (see FIG. 3). These details are described as functions in the flow diagram; the functions may be performed by the ducking amount calculator 400 as implemented by the mobile device 100 of FIG. 1 (e.g., according to a computer program executed by the processor 102).

At 402, the ducking amount calculator 400 adds the voice level 324 and the non-voice level 326.

At 404, the ducking amount calculator 400 subtracts the narration level 328 from the output of 402.

At 406, the ducking amount calculator 400 compares the output of 404 with a threshold value. The threshold value may be in decibels (dB). The threshold value may be adjusted, as more fully discussed below. If the output is not greater than the threshold value, the flow proceeds to 408. If the output is greater than the threshold, the flow proceeds to 410.

At 408, the ducking amount calculator 400 sets the ducking amount 330 to zero, and the flow ends.

At 410, the ducking amount calculator 400 compares the output of 404 with a knee value. The knee value may be adjusted, as more fully discussed below. If the output of 404 is not greater than the knee value, the flow proceeds to 412. If the output of 404 is greater than the knee value, the flow proceeds to 414 and 416.

At 412, the ducking amount calculator 400 applies a low ratio compressor to the output of 404 to generate the ducking amount 330. The low ratio compressor performs downward compression on the output of 404 in order to reduce the dynamic range of the output of 404. The flow then ends.

At 414, the ducking amount calculator 400 applies a low ratio compressor to the knee value. The flow then proceeds to 418.

At 416, the ducking amount calculator 400 applies a high ratio compressor to the output of 404 minus the knee value. Like the low ratio compressor (see 412 or 414), the high ratio compressor performs downward compression to reduce the dynamic range. The flow then proceeds to 418.

At 418, the ducking amount calculator 400 adds the outputs of 414 and 416 to generate the ducking amount 330, and the flow ends.

Within the ducking amount calculator 400, the parameters may be adjusted as follows. The threshold value (see 406) may generally range between 1 dB and 40 dB. A specific implementation uses 13 dB. The knee value (see 410) may generally range between 1 dB and 20 dB. A specific implementation uses 6 dB. The low ratio compressor (see 412 and 414) may generally compress at a ratio between 2:1 and 10:1. A specific implementation uses 2:1. The high ratio compressor may generally compress at a ratio between 2:1 and 10:1. A specific implementation uses 3:1.

Figure 5:
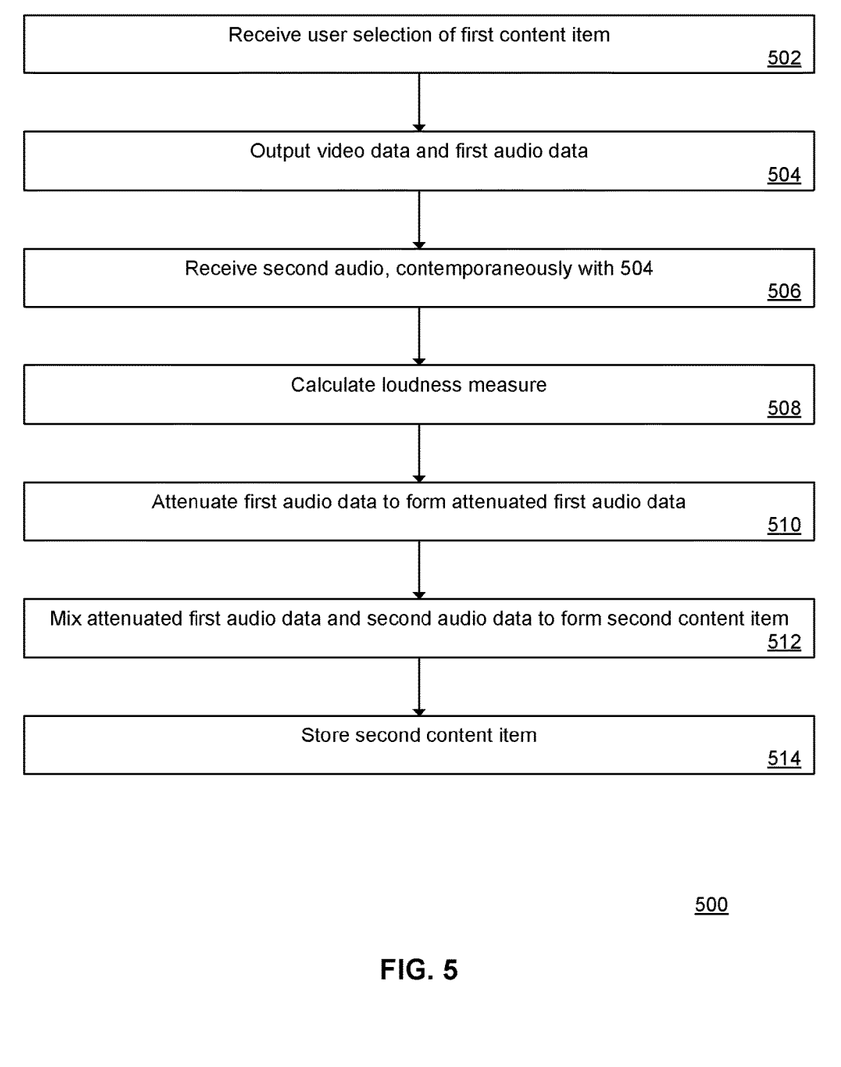
FIG. 5 is a flow diagram of a method 500 of automatically mixing first audio and second audio that are associated with video.

FIG. 5 is a flow diagram of a method 500 of automatically mixing first audio and second audio that are associated with video. The method 500 may be performed by the mobile device 100 (see FIG. 1), for example as controlled by one or more computer programs that are executed by the processor 102.

At 502, a user selection of a first content item is received. The first content item has video data and first audio data, where the first audio data is synchronized with the video data. The user may select the first content item from a number of content items that may be stored locally, remotely or both. As an example, the mobile device 100 (see FIG. 1) may receive the user selection of the first content item according to the user touching the screen 106.

At 504, the video data and the first audio data are outputted. As an example, the mobile device 100 (see FIG. 1) may display the video data on the screen 106, and may output the first audio data on the speaker 112.

At 506, second audio data is received. The second audio data may be received from a microphone of the mobile device. The second audio data is received contemporaneously with outputting the video data and the first audio data. In this manner, the user adds the second audio data as commentary or narration to the first content item. As an example, the mobile device 100 (see FIG. 1) may receive the second audio data using the microphone 110. As another example, the mobile device 100 may receive the second audio data via the narration interface 206 (see FIG. 2).

At 508, a loudness measure is calculated. The loudness measure includes a loudness of the first audio data. As an example, the mobile device 100 (see FIG. 1) may use the narration audio processor 230, the content audio processor 232, or both to calculate the loudness measure. As another example, the mobile device 100 may use the content analyzer 302 (see FIG. 3), the narration analyzer 304, or both to calculate the loudness measure.

At 510, the first audio data is attenuated according to the loudness measure to form attenuated first audio data. As an example, the mobile device 100 (see FIG. 1) may use the mixing processor 208 (see FIG. 2) to attenuate the first audio data and to form the attenuated first audio data. As another example, the mobile device 100 may use the ducking amount calculator 400 (see FIG. 3) and the audio mixer 306 to attenuate the first audio data and to form the attenuated first audio data.

At 512, the attenuated first audio data and the second audio data are mixed to form a second content item. The second content item has the video data, the attenuated first audio data, and the second audio data. The attenuated first audio data and the second audio data are synchronized with the video data. In this manner, the second content item corresponds to the first content item plus the narration, where the level of audio in the first content item has been automatically attenuated in the second content item. As an example, the mobile device 100 (see FIG. 1) may use the mixer 240 (see FIG. 2) or the audio mixer 306 (see FIG. 3) to mix the attenuated first audio data and the second audio data. As another example, the mobile device 100 may use the multiplexer 244 (see FIG. 2) to form the second content item.

At 514, the second content item, having been formed in 512, is stored. The second content item may be stored locally or remotely. For example, the mobile device 100 (see FIG. 1) may store the second content item locally in the memory 104. As another example, the mobile device 100 may store the second content item remotely using the radio 114.

Example Implementation

As discussed above, an embodiment may be implemented as a computer program executed by a mobile device. An example mobile device is an iPhone™ from Apple Inc., such as the iPhone™ 6s. The computer program may be an app executed by the iPhone™.

The app may show a landing screen on the mobile device when the app begins execution. The landing screen may display a logo of the app and may fade into a first interaction screen that provides the first instances of functionality.

The first interaction screen may display two options: to capture video, or to import video. In response to the user selecting one of these options, the app transitions to the capture screen or the import screen.

The capture screen may display options to capture video or pictures, as well as options such as a flash on/off toggle or other capture parameters. If the mobile device has front and rear cameras, the capture screen may display options for switching between them. Once the content has been captured, the content may be stored locally (e.g., in the memory 104 of FIG. 1). The capture screen may display an option to return to the first interaction screen.

The import screen may display various selection options for the source of content. The source may be local, such as in the memory (e.g., the memory 104 of FIG. 1), which may be represented as a camera roll or a video roll. The source may be remote, such as a cloud service provider (e.g., iCloud™ service, Dropbox™ service, etc.)

Once a content item has been selected, the app displays the narration screen. The narration screen allows the user to watch playback (and hear the audio) of the selected content, while recording their narration. In the narration screen, a video playback area allow for play, pause, stop and scrub through functionality as well as volume control. The volume control allows the user to manually lower, raise or mute the audio in the content. The mute button may instruct the system to totally remove (e.g., completely attenuate) the original audio from the original content when recording the narration for the new content.

The narration screen includes a narration button for the recording of high quality narration with a simple and quick user experience. The captured narration may be stored as PCM data. The narration capture allows for high quality voice capture and may automatically detect and lower background noise. The device may implement Dolby™ Voice features for noise reduction. The narration screen may display a loudness meter that displays the detected loudness of the narration. The narration screen may have an option to return to the first interaction screen.

An example of using the narration screen is as follows. The user touches the play button to begin playback of the content. At the point the user wants to begin narration, the user taps the narration button. As the content continues to play, the user narrates. When the user wants to stop narration, the user taps the narration button, and playback of the content continues. The user may then add additional narration as desired using similar steps (along with the play, pause and scrub through buttons).

Once the user has completed the narration, the app allows the user to use the play, pause and scrub through buttons to review the mixed content.

When the narration is complete (e.g., the user has performed a review of the mixed content), the app saves the new content (e.g., in the memory 104 of FIG. 1) and displays the summary screen. The summary screen may show thumbnail images of each saved content, its duration, its location, and its date of recording. Touching one of the thumbnails instructs the app to play the new content, allowing the user to view the new content in which the narration has been added to the original content, and the original audio has been intelligently mixed with the narration. The summary screen may have a delete button that the user touches for the app to delete a selected content item; the app may display the first interaction screen after deleting the content. The summary screen may have a share button that the user touches for the app to display the share screen.

The share screen displays a number of options for sharing the new content. These options may include social media (e.g., YouTube™ service, iCloud™ service, Facebook™ service, Twitter™ service, Vine™ service, etc.), email, text message, etc.

Each of the above screens may also include a home button. The user touching the home button instructs the app to return to the first interaction screen.

Narration Options

The narration audio processor 230 (see FIG. 2) may also process the narration for voice improvements. The processing may include noise reduction, dialogue clarity, audio leveling, and decorrelation. For noise reduction, the narration audio processor 230 suppresses non-voice signals detected in the signals captured by the microphone 110 (see FIG. 1). For dialogue clarity, the narration audio processor 230 performs processing that enhances the clarity and intelligibility of voice signals. For audio leveling, the narration audio processor 230 adapts the signals captured by the microphone 110 to a target level. For decorrelation, the narration audio processor 230 converts a monaural signal captured by the microphone 110 into a stereo signal.

The narration audio processor 230 may implement the Dolby™ Voice Processing Platform to perform these processes.

Voice Detection Options

As discussed above, the content analyzer 302 (see FIG. 3) determines the voice level 324 and the non-voice level 326 in the content 322. The content analyzer 302 may implement a voice activity detector to determine the voice level 324. For example, when the voice activity detector detects vocal sounds in the content 322, the voice level 324 corresponds to the audio level of the vocal sounds; when the voice activity detector does not detect vocal sounds, the voice level 324 is zero.

According to an embodiment, the content analyzer 302 implements a voice activity detector that uses a voice ratio to select between a fast decay nuisance level and a slow decay nuisance level, as described in U.S. Application Pub. No. 2015/0032446.

Implementation Details

An embodiment may be implemented in hardware, executable modules stored on a computer readable medium, or a combination of both (e.g., programmable logic arrays). Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, embodiments may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a non-transitory computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of automatically mixing first audio and second audio that are associated with video, the method comprising:

receiving, by a mobile device, a user selection of a first content item, wherein the first content item has video data and first audio data, and wherein the first audio data is synchronized with the video data;

outputting, by the mobile device, the video data and the first audio data;

receiving, by the mobile device, second audio data from a microphone of the mobile device, wherein the second audio data is received contemporaneously with outputting the video data and the first audio data;

calculating, by the mobile device, a loudness measure, wherein the loudness measure includes a loudness of the first audio data;

attenuating, by the mobile device, the first audio data according to the loudness measure to form attenuated first audio data;

mixing, by the mobile device, the attenuated first audio data and the second audio data to form a second content item, wherein the second content item has the video data, the attenuated first audio data, and the second audio data, and wherein the attenuated first audio data and the second audio data are synchronized with the video data; and storing, by the mobile device, the second content item having been formed, wherein attenuating the first audio data comprises:
comparing the loudness measure with a knee value;
when the loudness measure is less than the knee value, attenuating the first audio data using a first low ratio compressor based on the loudness measure; and
when the loudness measure is greater than the knee value, attenuating the first audio data using a sum of a second low ratio compressor and a high ratio compressor, wherein the second low ratio compressor is based on the knee value, and wherein the high ratio compressor is based on the loudness measure minus the knee value, and wherein calculating the loudness measure comprises:
calculating a first loudness of a voice signal in the first audio data;

calculating a second loudness of a non-voice signal in the first audio data;

calculating a third loudness of the second audio data; and determining the loudness measure as the first loudness plus the second loudness minus the third loudness.

2. The method of claim 1, wherein the second audio data corresponds to narration by a user of the mobile device.

3. The method of claim 1, further comprising:

receiving, by the mobile device, the video data and the first audio data, wherein the video data is received from a camera of the mobile device, and wherein the first audio data is received from a microphone of the mobile device; and storing, by the mobile device, the video data and the first audio data as the first content item in a local storage of the mobile device.

4. The method of claim 1, wherein the user selection selects the first content item from a plurality of first content items stored in a local storage of the mobile device.

5. The method of claim 1, wherein the user selection selects the first content item from a plurality of first content items stored in a remote storage that is remote from the mobile device, further comprising:

downloading, by the mobile device, the first content item from the remote storage.

6. The method of claim 1, wherein the video data is outputted from a display of the mobile device, and wherein the first audio data is outputted from a speaker of the mobile device.

7. The method of claim 1, wherein calculating the loudness measure comprises:

calculating a first loudness of a voice signal in the first audio data;

calculating a second loudness of a non-voice signal in the first audio data; and calculating a third loudness of the second audio data.

8. The method of claim 1, further comprising:

uploading, by the mobile device, the second content item to a remote storage that is remote from the mobile device.

9. The method of claim 1, further comprising:

outputting, by the mobile device, the video data, the attenuated first audio data, and the second audio data, wherein the video data is outputted from a display of the mobile device, and wherein the attenuated first audio data and the second audio data are outputted from a speaker of the mobile device.

10. The method of claim 1, further comprising:

receiving, by the mobile device, a user selection of a mute command, when outputting the video data and the first audio data, wherein the first audio data is completely attenuated when the user selection of the mute command is received.

11. An apparatus for automatically mixing first audio and second audio that are associated with video, the apparatus comprising:

a processor;
a memory;
a screen;
a camera;
a microphone;
a speaker; and
a radio, wherein the processor is configured to receive a user selection of a first content item, wherein the first content item has video data and first audio data, and wherein the first audio data is synchronized with the video data, wherein the screen is configured to output the video data, and wherein the speaker is configured to output the first audio data, wherein the microphone is configured to receive second audio data, wherein the second audio data is received contemporaneously with the screen outputting the video data and the speaker outputting the first audio data, wherein the processor is configured to calculate a loudness measure, wherein the loudness measure includes a loudness of the first audio data, wherein the processor is configured to attenuate the first audio data according to the loudness measure to form attenuated first audio data, wherein the processor is configured to mix the attenuated first audio data and the second audio data to form a second content item, wherein the second content item has the video data, the attenuated first audio data, and the second audio data, and wherein the attenuated first audio data and the second audio data are synchronized with the video data, wherein the memory is configured to store the second content item having been formed, wherein the processor is configured to attenuate the first audio data by comparing the loudness measure with a knee value, wherein when the loudness measure is less than the knee value, the processor is configured to attenuate the first audio data using a first low ratio compressor based on the loudness measure, wherein when the loudness measure is greater than the knee value, the processor is configured to attenuate the first audio data using a sum of a second low ratio compressor and a high ratio compressor, wherein the second low ratio compressor is based on the knee value, and wherein the high ratio compressor is based on the loudness measure minus the knee value, wherein the processor is configured to calculate a first loudness of a voice signal in the first audio data, wherein the processor is configured to calculate a second loudness of a non-voice signal in the first audio data, wherein the processor is configured to calculate a third loudness of the second audio data, and wherein the processor is configured to determine the loudness measure as the first loudness plus the second loudness minus the third loudness.

12. The apparatus of claim 11, wherein the processor is configured to calculate a first loudness of a voice signal in the first audio data;

wherein the processor is configured to calculate a second loudness of a non-voice signal in the first audio data;

wherein the processor is configured to calculate a third loudness of the second audio data; and wherein the loudness measure includes the first loudness, the second loudness and the third loudness.

13. The apparatus of claim 11, wherein the camera is configured to receive the video data;

wherein the microphone is configured to receive the first audio data; and wherein the memory is configured to store the video data and the first audio data as the first content item.

14. The apparatus of claim 11, wherein the screen is configured to output the video data; and wherein the speaker is configured to output the first audio data.

15. The apparatus of claim 11, wherein the radio is configured to upload the second content item to a remote storage that is remote from the mobile device.

16. The apparatus of claim 11, wherein the screen is configured to output the video data, and
wherein the speaker is configured to output the attenuated first audio data and the second audio data.

17. The apparatus of claim 11, wherein the processor is configured to receive a user selection of a mute command, when outputting the video data and the first audio data, wherein the first audio data is completely attenuated when the user selection of the mute command is received.

18. A non-transitory computer readable medium storing a computer program for controlling a mobile device to automatically mix first audio and second audio that are associated with video, wherein the mobile device includes a processor, a memory, a screen, a camera, a microphone, a speaker, and a radio, and wherein the computer program when executed by the processor performs a method comprising:
receiving, by the mobile device, a user selection of a first content item, wherein the first content item has video data and first audio data, and wherein the first audio data is synchronized with the video data;
outputting, by the mobile device, the video data and the first audio data;
receiving, by the mobile device, second audio data from the microphone of the mobile device, wherein the second audio data is received contemporaneously with outputting the video data and the first audio data;
calculating, by the mobile device, a loudness measure, wherein the loudness measure includes a loudness of the first audio data;
attenuating, by the mobile device, the first audio data according to the loudness measure to form attenuated first audio data;
mixing, by the mobile device, the attenuated first audio data and the second audio data to form a second content item, wherein the second content item has the video data, the attenuated first audio data, and the second audio data, and wherein the attenuated first audio data and the second audio data are synchronized with the video data; and
storing, by the mobile device, the second content item having been formed,
wherein attenuating the first audio data comprises:
comparing the loudness measure with a knee value;
when the loudness measure is less than the knee value, attenuating the first audio data using a first low ratio compressor based on the loudness measure; and
when the loudness measure is greater than the knee value, attenuating the first audio data using a sum of a second low ratio compressor and a high ratio compressor, wherein the second low ratio compressor is based on the knee value, and wherein the high ratio compressor is based on the loudness measure minus the knee value, and
wherein calculating the loudness measure comprises:
calculating a first loudness of a voice signal in the first audio data;
calculating a second loudness of a non-voice signal in the first audio data;
calculating a third loudness of the second audio data; and
determining the loudness measure as the first loudness plus the second loudness minus the third loudness.

19. The non-transitory computer readable medium of claim 18, wherein the method further comprises:
receiving, by the mobile device, the video data and the first audio data, wherein the video data is received from the camera of the mobile device, and wherein the first audio data is received from the microphone of the mobile device; and
storing, by the mobile device, the video data and the first audio data as the first content item in the memory of the mobile device.

20. The non-transitory computer readable medium of claim 18, wherein the video data is outputted from the screen of the mobile device, and wherein the first audio data is outputted from the speaker of the mobile device.

* * * * *